United States Patent
Covell et al.

(10) Patent No.: US 8,712,930 B1
(45) Date of Patent: Apr. 29, 2014

(54) ENCODING DIGITAL CONTENT BASED ON MODELS FOR PREDICTING SIMILARITY BETWEEN EXEMPLARS

(75) Inventors: Michele Covell, Palo Alto, CA (US); Mei Han, Palo Alto, CA (US); Saurabh Mathur, Sunnyvale, CA (US); Shumeet Baluja, Santa Clara, CA (US); Vivek Kwatra, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 428 days.

(21) Appl. No.: 13/100,872

(22) Filed: May 4, 2011

Related U.S. Application Data (60) Provisional application No. 61/372,079, filed on Aug. 9, 2010.

(51) Int. Cl.
*G06F 15/18* (2006.01)

(52) U.S. Cl.
USPC .......................................................... 706/12

(58) Field of Classification Search
USPC ..................................... 706/12; 382/103, 224
See application file for complete search history.

(56) References Cited

U.S. PATENT DOCUMENTS

| | | | |
|---|---|---|---|
| 6,108,448 A | 8/2000 | Song et al. | |
| 6,115,035 A | 9/2000 | Compton et al. | |
| 6,539,460 B2 | 3/2003 | Castelli et al. | |
| 6,571,016 B1 | 5/2003 | Mehrotra et al. | |
| 6,574,279 B1 | 6/2003 | Vetro et al. | |
| 6,625,319 B1 | 9/2003 | Krishnamachari | |
| 6,771,828 B1 | 8/2004 | Malvar | |
| 7,162,091 B2 | 1/2007 | Wang et al. | |
| 7,181,072 B2 | 2/2007 | Wang et al. | |
| 7,251,376 B2 | 7/2007 | Qian et al. | |
| 7,397,858 B2 | 7/2008 | Garrido et al. | |
| 7,471,724 B2 | 12/2008 | Lee | |
| 7,836,050 B2 | 11/2010 | Jing et al. | |
| 7,961,922 B2 | 6/2011 | Spence et al. | |
| 8,169,497 B2 | 5/2012 | Wan | |
| 8,363,953 B2 | 1/2013 | Kameyama | |
| 8,515,193 B1 | 8/2013 | Han et al. | |
| 8,532,394 B2 | 9/2013 | Kameyama | |
| 2003/0123737 A1* | 7/2003 | Mojsilovic et al. | 382/224 |
| 2004/0190633 A1 | 9/2004 | Ali et al. | |
| 2006/0093188 A1* | 5/2006 | Blake et al. | 382/103 |

(Continued)

OTHER PUBLICATIONS

Baluja, S., et al., "Beyond "Near-Duplicates": Learning Hash Codes for Efficient Similar-Image Retrieval" ICPR'10, International Conference on Pattern Recognition, Aug. 20, 2010, pp. 543-547.

(Continued)

*Primary Examiner* — Jeffrey A Gaffin
*Assistant Examiner* — Ola Olude Afolabi
(74) *Attorney, Agent, or Firm* — Fenwick & West LLP (57) ABSTRACT

An exemplar dictionary is built from exemplars of digital content for determining predictor blocks for encoding and decoding digital content. The exemplar dictionary organizes the exemplars as clusters of similar exemplars. Each cluster is mapped to a label. Machine learning techniques are used to generate a prediction model for predicting a label for an exemplar. The exemplar dictionary is used to encode digital content. Clusters of exemplars are obtained by applying a prediction model to a target block of digital content for encoding. A predictor block is selected for encoding the target block based on frequency of occurrence of exemplars in the clusters. The target block is encoded using the predictor block.

18 Claims, 7 Drawing Sheets

(56) References Cited

U.S. PATENT DOCUMENTS

| | | |
|---|---|---|
| 2007/0074251 A1 | 3/2007 | Oguz et al. |
| 2008/0127270 A1 | 5/2008 | Shipman et al. |
| 2009/0022472 A1 | 1/2009 | Bronstein et al. |
| 2010/0086062 A1 | 4/2010 | Pace |
| 2010/0125871 A1 | 5/2010 | Liao et al. |
| 2011/0218997 A1 | 9/2011 | Boiman et al. |
| 2011/0246440 A1 | 10/2011 | Kocks et al. |
| 2012/0099785 A1 | 4/2012 | Hill et al. |

OTHER PUBLICATIONS

Barnes, C., et al., "PatchMatch: A Randomized Correspondence Algorithm for Structural Image Editing," ACM Transactions on Graphics (Proc. SIGGRAPH), Aug. 2009, 10 pages.

Cui, J., et al., "Example-Based Image Commpression," 17th IEEE International Conference on Image Processing (ICIP), 2010, 4 Pages.

Datar, M., et al., "Locality Sensitive Hashing Scheme Based on p-Stable Distributions," SoCG'04, Jun. 9-11, 2004, New York, USA, ACM, 10 Pages.

Grundmann, M., et al., "Efficient Hierarchical Graph-Based Video Segmentation," CVPR, 2010, pp. 1-8.

Khan, A., et al., "Content Classification Based on Objective Video Quality Evaluation for MPEG4 Video Streaming over Wireless Networks," Proceedings of the World Congress on Engineering 2009, vol. I WCE 2009, Jul. 1-3, 2009, London, U.K., 6 pages.

Kleinberg, J., et al., "Algorithm Design," Chapter 1, Introduction: Some Representative Problems, Pearson Education Inc., 2006, 13 pages.

MacQueen, J. B., "Some Methods for classification and Analysis of Multivariate Observations," Proceedings of 5-th Berkeley Symposium on Mathematical Statistics and Probability, 1967, Berkeley, University of California Press, vol. 1, pp. 281-297.

Shlens, J., "A Tutorial on Principal Component Analysis-Derivation, Discussion and Singular Value Decomposition," Mar. 25, 2003, PCA-Tutorial-Intuition, Version 1, pp. 1-16, available at <URL:http://www.cs.princeton.edu/picasso/mats/PCA-Tutorial-Intuition_jp.pdf>.

Yianilos, P., "Data Structures and Algorithms for Nearest Neighbor Search in General Metric Spaces," NEC Research Institute Technical Report Fourth, Jun. 1992, 11 pages.

\* cited by examiner

ENCODING DIGITAL CONTENT BASED ON MODELS FOR PREDICTING SIMILARITY BETWEEN EXEMPLARS

CROSS REFERENCES TO RELATED APPLICATIONS

This application claims the benefit of U.S. Provisional Application No. 61/372,079, filed Aug. 9, 2010 which is incorporated by reference in its entirety.

FIELD OF THE INVENTION

This invention relates to searching for similar exemplars in a dictionary of digital content using prediction models, including audio, image, and/or video content.

BACKGROUND

Searching for examples similar to a given input example in a dictionary of digital content is often required in applications, for example, image encoding and decoding, texture synthesis, and the like. Digital content includes audio, image, and/or video content. Applications that perform image encoding and decoding often perform multiple dictionary searches. For example, an image being encoded can be divided into several image blocks and a dictionary search performed to find an example image or image block similar to each image block. If the dictionary searches are inefficient, the entire encoding process becomes slow and may not be acceptable.

An example of a conventional approach for dictionary search is a tree-based search. A tree-based search can be performed in a dictionary organized as a tree structure such that leaf nodes of the tree represent similar content. Search is performed by making a decision at each node of the tree regarding which branch of the tree to follow to continue the search. Since each search requires traversing several levels of the tree, each level requiring one or more comparisons of image blocks, the tree-based search is slow.

Conventional tree-based searches also have a drawback in that examples belonging to two different leaf nodes of the tree are not guaranteed to be similar. For example, two neighboring leaf nodes may be neighbors in the tree structure but an image taken from one of the leaf nodes may be very different from an image taken from the neighboring leaf node. As a result, a slight error in traversing the tree caused by taking an incorrect branch of the tree at a higher level of the tree may result in arriving at a leaf node that does not comprise examples similar to the input example. For these reasons, images encoded/decoded using these techniques may have poor quality or the encoding/decoding process may have poor performance.

SUMMARY

The above and other issues are addressed by a computer-implemented method, computer system, and computer program product for encoding digital content. Embodiments of the method for encoding digital content determine a predictor block for encoding an input block of digital content. A target block of digital content is received for encoding. A plurality of clusters of exemplars is obtained by applying one or more prediction models to the target block. Each prediction model maps blocks of digital content to clusters of similar exemplars. A frequency of occurrence of exemplars in the plurality of clusters is determined. A predictor block is selected for encoding the target block based on criteria including the frequency of occurrence of exemplars in the plurality of clusters. The target block is encoded using the predictor block.

Embodiments of the computer program product for encoding digital content include a non-transitory computer-readable storage medium storing computer-executable code for determining a predictor block for encoding an input block of digital content. The computer-executable code comprises an encoder module. The encoder module is configured to receive a target block of digital content for encoding and obtain a plurality of clusters of exemplars by applying one or more prediction models to the target block. Each prediction model maps blocks of digital content to clusters of similar exemplars. The encoder module is configured to determine a frequency of occurrence of exemplars in the plurality of clusters and to select a predictor block for encoding the target block based on criteria including the frequency of occurrence of exemplars in the plurality of clusters. The encoder module is further configured to encode the target block using the predictor block.

Embodiments of the computer systems for encoding digital content include a computer processor and a non-transitory computer-readable storage medium storing computer-executable code. The computer-executable code comprises an encoder module. The encoder module is configured to receive a target block of digital content for encoding and obtain a plurality of clusters of exemplars by applying one or more prediction models to the target block. Each prediction model maps blocks of digital content to clusters of similar exemplars. The encoder module is configured to determine a frequency of occurrence of exemplars in the plurality of clusters and to select a predictor block for encoding the target block based on criteria including the frequency of occurrence of exemplars in the plurality of clusters. The encoder module is further configured to encode the target block using the predictor block.

The features and advantages described in this summary and the following detailed description are not all-inclusive. Many additional features and advantages will be apparent to one of ordinary skill in the art in view of the drawings, specification, and claims hereof.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures.

System Environment and Architectural Overview

Figure 1:
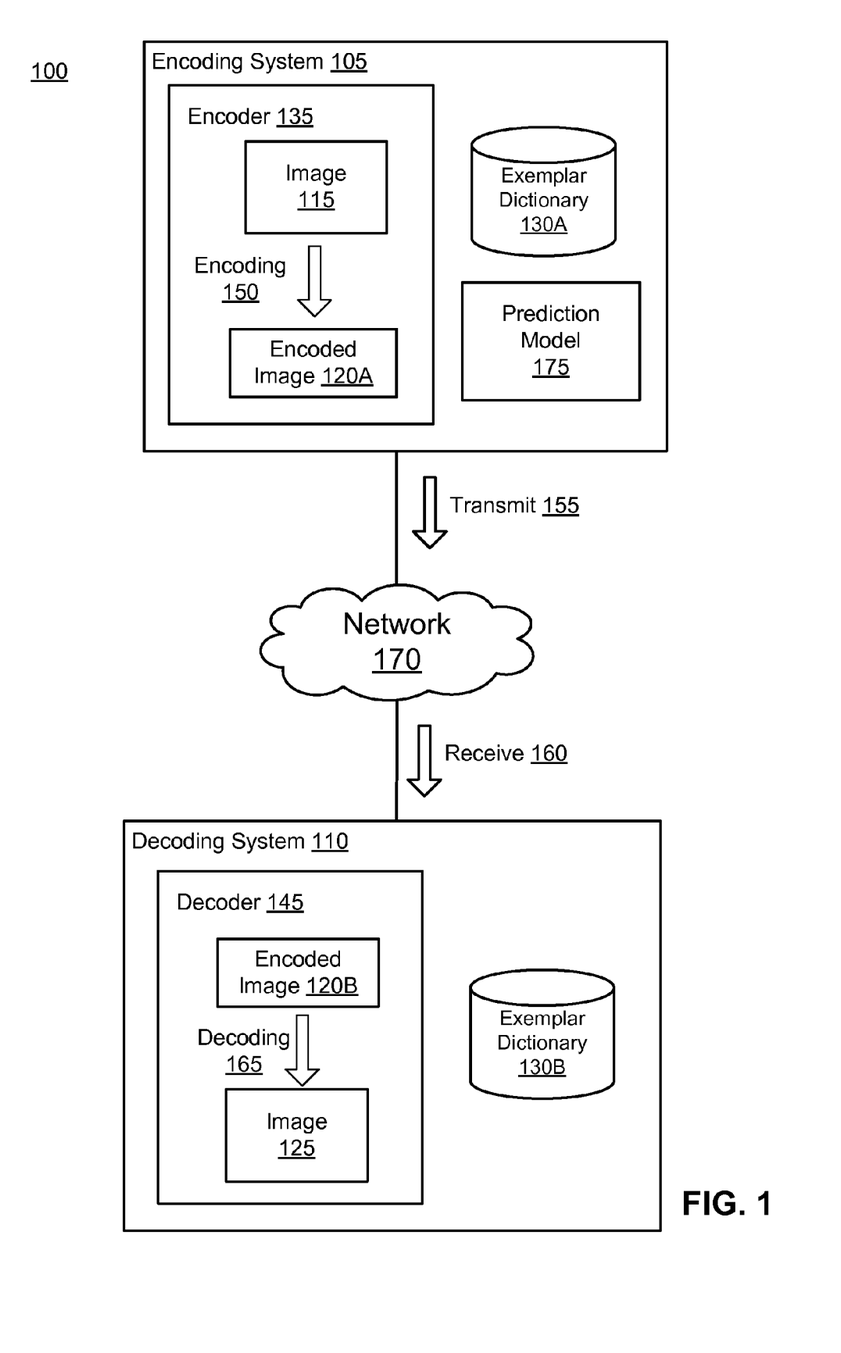
FIG. 1 is a high-level block diagram of a computing environment illustrating the steps of encoding/decoding an image according to one embodiment of the present invention.

FIG. 1 is a high-level block diagram of a computing environment illustrating the steps of encoding and decoding an image according to one embodiment of the present invention. As shown, the computing environment 100 includes an encoding system 105 and a decoding system 110 connected through a network 170. In one embodiment, the encoding system 105 or the decoding system 110 can be a conventional computer system executing, for example, a Microsoft Windows-compatible operating system (OS), Apple OS X, and/or a Linux distribution. In another embodiment, the encoding system 105 or the decoding system 110 can be a device having computer functionality, such as a personal digital assistant (PDA), mobile telephone, video game system, etc.

The network 170 enables communications between the encoding system 105 and the decoding system 110. In one embodiment, the network 170 uses standard communications technologies and/or protocols. Thus, the network 170 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 170 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 170 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 170 can also include links to other networks such as the Internet.

FIG. 1 and the other figures use like reference numerals to identify like elements. A letter after a reference numeral, such as "120A," indicates that the text refers specifically to the element having that particular reference numeral. A reference numeral in the text without a following letter, such as "120," refers to any or all of the elements in the figures bearing that reference numeral (e.g. "120" in the text refers to reference numerals "120A" and/or "120B" in the figures).

The encoding system 105 comprises an encoder module 135, an exemplar dictionary 130A, and one or more prediction models 175. The encoder module 135 encodes 150 an original image 115 to generate an encoded image 120A. The original image 115 can be, for example, a still image or an image contained in a frame of video. The encoding 150 compresses the original image 115 to produce an encoded, or "compressed," image 120A that represents the original image using less information (e.g., fewer bits) compared to the original image 115. The encoded image 120A thus provides for efficient storage of the information in the original image 115.

The encoded image 120A also allows for efficient transmission 155 of the information in the original image 115 over the network 170. For example, the encoded image 120A can be transmitted 155 by the encoding system 135 over the network 170 and received 160 by decoding system 110. The encoded image 120B received by the decoding system 110 represents the copy of encoded image 120A held by the decoding system 110.

The encoded image 120A can be transmitted 155 by the encoding system 105 over the network 170 and received 160 by the decoding system 110. This transmission scenario can occur, for example, when a user is using the decoding system 110 to browse the web and download images from web sites. The images can be still images, frames of video arranged in a sequence and stored in a discrete file, and/or frames of video streamed to the decoding system 110. The encoded image 120B received by the decoding system 110 represents the copy of encoded image 120A held by the encoding system 105.

The decoding system 110 comprises a decoder module 145 and an exemplar dictionary 130B. The decoder module 145 can decode 165 the encoded image 120B to obtain a replica of the original image or an approximation of the original image, the "decompressed" image 125. The decoder module 145 uses the exemplar dictionary 130B for identifying predictor blocks used for decoding the blocks of the encoded image 120B. Each predictor block may be identified by a unique identifier within the exemplar dictionary 130B. The encoding/decoding techniques described herein can also be used in non-networked environments.

In one embodiment, the encoding process 150 used by the encoding system 105 uses a block-based technique. In this technique, the image is divided into a set of blocks, such as blocks of 16×16 pixels. A block to be encoded, called a "target block," is encoded by describing the differences between the target block and another block, called the "predictor block." Said another way, the predictor block is used to "predict" the target block, and the result of this prediction is encoded. The encoding system 105 obtains the predictor block from the exemplar dictionary 130A.

The exemplar dictionary 130 is a store of exemplar images, each exemplar image comprising one or more image blocks that can be used as predictors for encoding target blocks in the image 115. The exemplar dictionary 130 is structured to allow the encoding system 105 to search for predictor blocks that are similar to a target block. The exemplar dictionary 130 may comprise a large number of exemplar images, for example, several million exemplar images.

In an embodiment, the exemplar dictionary 130 is organized into clusters of similar exemplars. Each cluster of similar exemplars is associated with a label. One or more prediction models 175 take a target image block as input and predict labels associated with clusters of exemplars similar to the target image block. This allows the encoding system 105 to map a target image block to clusters of exemplars. The encoding system 105 selects a predictor block for the target image block from the exemplars of the mapped clusters.

Figure 2:
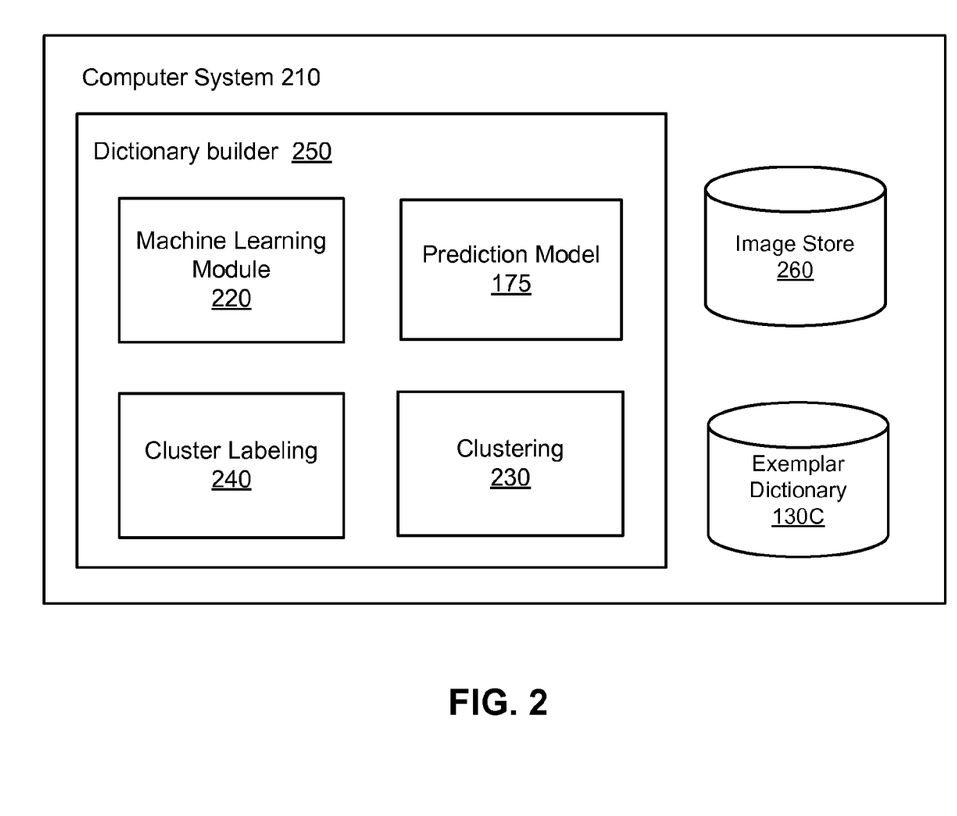
FIG. 2 is a high-level block diagram illustrating modules within a computer system for generating a hashing function for mapping exemplars to labels according to one embodiment of the present invention.

In an embodiment, the prediction model 175 implements a hashing function that generates a hash key value for a given target image block. The hashing function is configured such that target image blocks that generate the same hash key value are similar to each other. Each hash key value corresponds to a label associated with a cluster from the exemplar dictionary 130. In an embodiment, the hashing function implemented by the prediction model 175A is generated by the machine-learning module 220 further described herein.

In an embodiment, the hashing function of the prediction model 175 maps the target image block to multiple hash key values. Each hash key value generated from the target image block is associated with a cluster of the exemplar dictionary 130. As a result, one target image block is mapped to multiple clusters. Exemplars from the mapped clusters are used to select a predictor block for encoding the target image block. For example, the predictor block can be selected based on the number of mapped clusters that an exemplar belongs to.

The exemplar dictionary 130 can be built either by the encoding system 105, by the decoding system 110, or by any other computing system and transmitted to the encoding system 105 or the decoding system 110 as necessary. Transmission of the exemplar dictionary 130 can be a slow process due to the size of the information stored in the exemplar dictionary 130. The exemplar dictionary 130 can be transmitted either electronically or by physical transmission of a storage device storing the exemplar dictionary 130. The exemplar images stored in the exemplar dictionary 130 can be obtained from various sources, for example, stores of preexisting images in an enterprise.

FIG. 2 is a high-level block diagram illustrating modules within a computer system 210 for building an exemplar dictionary 130 according to one embodiment of the invention. The computer system 210 comprises a dictionary builder module 250, an image store 260, and an exemplar dictionary 130C. Some embodiments of the computer system 210 have different and/or other modules than the ones described herein, and the functions can be distributed among the modules in a different manner than described here. For example, the computer system 210 might also include other modules shown in the encoding system 105 or the decoding system 110.

The image store 260 stores a set of exemplar images. The exemplar images can show different types of entities such as buildings, people, animals, birds, trees, natural scenery or combinations of these. The exemplar images may be collected from different sources, for example, images uploaded by users of an image storage system, images obtained by professional stock photography, image galleries, and the like. Each image may include one or more image blocks.

The dictionary builder module 250 builds the exemplar dictionary 130 based on the images in the image store 260. To this end, the dictionary builder module 250 includes a clustering module 230, cluster labeling module 240, a machine learning module 220, and one or more prediction models 175. Other embodiments of the dictionary builder module 250 can have different and/or other modules than the ones described herein, and the functions can be distributed among the modules in a different manner than is described here.

The machine learning module 220 generates one or more prediction models 175. In an embodiment, each prediction model 175 comprises classifiers that produce a binary value for a given exemplar based on certain characteristics of the exemplar. For example, a classifier may generate binary value 0 for exemplars with a particular type of texture and binary value 1 for exemplars without that type of texture. The binary value generated by a binary classifier can be used to divide the input exemplars into two sets or clusters, one cluster corresponding to binary value 0 and the other cluster corresponding to binary value 1. Similarly, two binary classifiers can be used to represent two different characteristics. As a result, two binary classifiers can be used to divide an input set of exemplars into four clusters of exemplars, each cluster corresponding to a combination of binary values, i.e., (0,0), (0,1), (1,0), and (1,1). In general, k binary classifiers can be used to divide the input set of exemplars into $2^k$ clusters, each cluster representing exemplars with a particular combination of characteristics. The binary values corresponding to a cluster can be used to represent a label corresponding to the cluster. Accordingly, the prediction models 175 can be considered as predicting portions of the label corresponding to a cluster for a given exemplar. In an embodiment, the prediction model 175 is represented as a hashing function. The hash keys generated by the hashing function correspond to the labels of the clusters of exemplars.

The machine learning module 220 uses the clustering module 230 and the cluster labeling module 240 to generate the prediction model 175. The dictionary builder 250 uses the prediction model 175 to structure the exemplars from the image store 260 into clusters of similar exemplars stored in the exemplar dictionary 130. The prediction model 175 is also used by the encoder 135 to map an input image block to the clusters of similar exemplars from the exemplar dictionary 130.

In an embodiment, the machine learning module 220 uses the clustering module 230 to determine an initial set of clusters. The clustering module 230 may use a similarity-based clustering method, for example, k-means clustering to determine the clusters. Similarity between exemplars is based on criteria used for comparing images, for example, based on a distance computed using feature vectors representing the images being compared. Distance between feature vectors corresponding to two exemplars can be measured using a distance metric, for example, the L1 norm or the L2 norm.

The cluster labeling module 240 assigns a label to each cluster generated by the clustering module 230. The cluster labeling module 240 performs an initial assignment of labels to the clusters. The initial assignment of labels to the clusters can be random. Each exemplar of a cluster is considered to be mapped to the label corresponding to the cluster. The machine learning module 220 uses the mapping from exemplars to the labels to generate training data sets for the prediction model 175. The machine learning module 220 initially trains the prediction model 175 using the initial assignment of the clusters to the labels which could be random. A random assignment from clusters to labels may not be learnable by the generated prediction model 175. As a result, the prediction model may not accurately predict the assigned labels when applied to exemplars from the cluster. However, the cluster labeling module 240 reassigns the labels to the cluster based on criteria that improves predictability of a prediction model 175 generated from the new mapping. In an embodiment, the reassignment of the labels is based on the prediction model 175 generated from the previous assignment. For example, the prediction model 175 generated by the previous assignment is used to predict labels for exemplars from each cluster. The predicted labels obtained from each cluster are used to determine the reassignment of the labels. The machine learning module 220 trains the prediction model 175 based on the new assignment from clusters to labels. This process is repeated iteratively in order to improve the prediction model 175.

The training set for the prediction model 175 is obtained from a mapping from the clusters to labels. The mapping from clusters to labels can be used to map exemplars belonging to the clusters to the corresponding labels. The training sets comprise subsets of the mapping from exemplars to the labels. For example, if the prediction model 175 comprises a classifier for predicting a bit of a representation of the labels, the training set comprises a set of exemplars that map to a bit value 0 and a set of exemplars that map to a bit value 1. Similar training sets can be obtained for classifiers for predicting each bit of the representation of labels.

The prediction model 175 may not accurately predict the originally mapped label for each exemplar of the cluster. For example, a cluster C1 may be mapped to a label L1 in the random input mapping used for training the prediction model 175 but the model may map several exemplars from cluster C1 to a label L2. The cluster labeling module 240 determines a measure of strength of association between the clusters and the labels based on the predictions made by the prediction model 175. For example, if the prediction model 175 predicts L2 as the label for more than a threshold number of exemplars of clusters C1, the cluster C1 can be considered strongly associated with label L2.

In an embodiment, the cluster labeling module 240 determines the strength of association between each exemplar of the cluster and each label. The strength of association of the cluster with respect to a label is determined based on an aggregate strength of association of exemplars belonging to the cluster with the label. The aggregate strength of association may be determined using a statistical aggregate measure, for example, an average value, a median value or any other statistical measure for aggregating scores.

In an embodiment, the strength of association of an exemplar with a particular label is based on the Hamming distance between the particular label and the predicted label for the exemplar. For example, the association of an exemplar with a particular label is inversely proportional to the Hamming distance between the label and the predicted label for the exemplar. Accordingly, if the predicted label is close to a label based on the Hamming distance, the exemplar is considered strongly associated with that label. On the other hand, if the predicted label for the exemplar has a large Hamming distance compared to a label, the exemplar is determined to be less strongly associated with the label.

The strength of association of a cluster with respect to a label is determined as an aggregate value of the strengths of associations of the exemplars belonging to the cluster with respect to the label. For example, the strengths of association of individual exemplars belonging to a cluster C1 can be indicated as shown in Table I below.

TABLE I

| Exemplars | Label L1 | Label L2 | ... | Label LN |
|---|---|---|---|---|
| Exemplar E1 | s(1, 1) | s(1, 2) | ... | s(1, N) |
| Exemplar E2 | s(2, 1) | s(2, 2) | ... | s(2, N) |
| ... | ... | ... | ... | ... |
| Exemplar EM | s(M, 1) | s(M, 2) | ... | s(M, N) |

As shown in Table I, the strength of association of exemplar Ei with respect to label Lj is shown as score value s(i,j), where i can be any one of values 1, 2, 3, . . . M and j can be any one of values 1, 2, 3, . . . N. The strength of association of cluster C1 with respect to label L1 can be determined using an aggregate value based on the score values s(1,1), s(2,1), . . . , s(M,1) that are present in the column under label L1. Similarly, the strength of association of cluster C1 with respect to any label Li can be determined using an aggregate value based on the score values s(1,i), s(2,i), . . . , s(M,i) that are present in the column under label Li.

The process of determining the strength of association for a cluster can be repeated for each cluster. As a result, the strength of association of each cluster with respect to each label is obtained. Table II below shows an example mapping from clusters C1, C2, . . . , CN to labels L1, L2, . . . , LN. The strength of association of a cluster Ci with a label Lj is represented as a value score(i,j).

TABLE II

| Clusters | Label L1 | Label L2 | ... | Label LN |
|---|---|---|---|---|
| Cluster C1 | score(1, 1) | score(1, 2) | ... | score(1, N) |
| Cluster C2 | score(2, 1) | score(2, 2) | ... | score(2, N) |
| ... | ... | ... | ... | ... |
| Cluster CN | score(N, 1) | score(N, 2) | ... | score(N, N) |

A cluster may be associated with a label in the current mapping but may have a higher score indicating strength of association with another label. For example cluster C1 may be mapped to L1 in the current mapping but the score value score(1,2) may be higher than the score value score(1,1) indicating that the cluster C1 has a better strength of association with respect to label L2 than label L1. It is possible that several clusters have higher strength of association with a label other than the label that the cluster is currently mapped to. Accordingly, a new mapping from the clusters to the labels can be determined based on the strengths of associations indicated in Table II that improves the overall strengths of associations between clusters and labels.

The cluster labeling module 240 reassigns labels to clusters such that the new mapping has an improved aggregate strength of association between exemplars of each cluster and the mapped label compared to the previous mapping. The process of determining a mapping that maximizes the overall strength of association between clusters and labels can be solved using a combinatorial optimization algorithm. In an embodiment, the clusters and labels are represented as nodes of a graph. An edge connecting a cluster to a label is associated with a weight representing the strength of association between the cluster and the label. The graph between the clusters and labels so obtained is a weighted bipartite graph in which all the edges are from the set of nodes representing the clusters to the set of nodes representing the labels. The bipartite graph representation can be used to determine a mapping that optimizes the strength of association between clusters and labels using the Hungarian-matching algorithm that performs maximum weight matching of the bipartite graph connecting clusters to labels. The maximum weight matching algorithm swaps two edges of the bipartite graph if the swapping improves the aggregate strength of association between clusters and labels for the bipartite graph.

The new mapping from clusters to labels is used to generate new training data sets that are provided to the machine learning module 220. The machine learning module 220 learns a new hashing function based on the new training data set. The cluster labeling module 240 again determines the strength of association between the clusters and the labels based on the new hashing function. The cluster labeling module 240 repeats the process of reassigning the clusters to the labels so as to improve an aggregate measure of strength of association between the clusters and the labels.

The reassignment of labels of clusters is repeated multiple times to improve the aggregate measure of strength of association between the exemplars of the clusters and the assigned labels. The process of reassignment can be repeated until the incremental improvement in the aggregate measure of strength of association between two subsequent reassignments is below a threshold level. Alternatively, the process of reassignment can be repeated for a predetermined number of iterations.

Generating the Prediction Model

Figure 3:
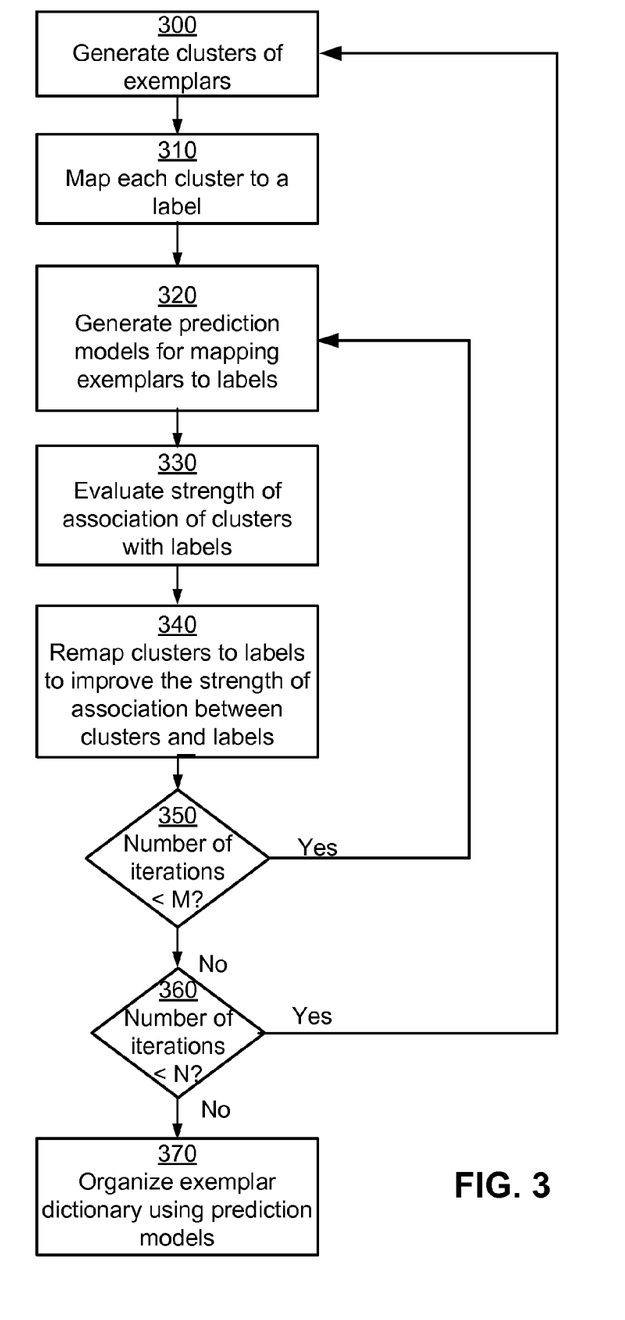
FIG. 3 is a flow diagram illustrating a process for generating the hashing function based on machine learning according to one embodiment of the present invention.

FIG. 3 is a flowchart illustrating the process for generating the prediction model for predicting labels for exemplars using machine learning, according to an embodiment of the invention. The clustering module 230 generates 300 a set of clusters based on an input set of exemplars. The cluster labeling module 240 maps 310 each cluster to a label. The initial mapping of clusters to labels can be random. The machine learning module 220 generates 320 a prediction model for predicting labels for a given exemplar. The prediction model is iteratively refined to improve the quality of prediction of the model. The quality of prediction of the model can be measured based on the accuracy with which the model maps an input exemplar to a cluster of exemplars similar to the input exemplar. The prediction model 175 is trained using a training data set obtained from the current mapping of clusters to labels.

The cluster labeling module 240 evaluates 330 a measure of strength of association of clusters with labels. The prediction model 175 is used to predict labels for exemplars belonging to a cluster. The cluster labeling module 240 evaluates 330 the strength of association of each cluster with the labels. The cluster labeling module 240 determines an association of a cluster with a label based on an aggregate value of the associations of the exemplars belonging to the cluster with the label.

The cluster labeling module 240 remaps 340 the clusters to the labels based on the strength of association between clusters and labels. The new mapping of labels to clusters improves the overall strength of association between the clusters and labels as aggregated over all the clusters compared with the previous mapping. The cluster labeling module 240 repeats until a stopping condition is reached. Examples of stopping conditions include a counter reaching 350 a predetermined number of iterations or the number of changes in labels during remapping 340 being below a threshold value. The cluster labeling module 240 checks 350 if the process of determining the prediction models has been repeated at least a predetermined number of times. For each iteration, the cluster labeling module 240 determines 320 a new prediction model 175, evaluates 330 the strength of association between the clusters and the labels, and remaps 340 clusters based on the strength of association between the clusters and the labels.

In an embodiment, the cluster labeling module 240 repeats 360 the overall process including the steps 300, 310, 320, 330, 340, and 350 to generate multiple prediction models 175. The process can be repeated by varying various parameters associated with the process, for example, by using different input sets of exemplars for determining the initial set of clusters, by using a different machine learning technique, or by using different sets of feature vectors for representing the exemplars. As a result, several prediction models 175 for predicting the label for a given exemplar are obtained from the process illustrated in FIG. 3. In an embodiment, the different sets of clusters may be processed concurrently, for example, on different processors. The prediction models 175 are stored. The prediction models 175 may be stored at other stages of the process, for example, after step 320.

The dictionary builder module 250 uses the prediction model 175 to organize 370 the exemplar dictionary 130. The dictionary builder module 250 applies the prediction model 175 to a set of input exemplars and determines the label corresponding to each exemplar. The dictionary builder module 250 assigns exemplars mapping to the same label to the same cluster. If there are multiple prediction models, each exemplar is mapped to multiple labels and belongs to multiple clusters. The exemplar dictionary 130 stores the information describing each cluster and the associated label.

Encoding Images Using the Exemplar Dictionary

Figure 4:
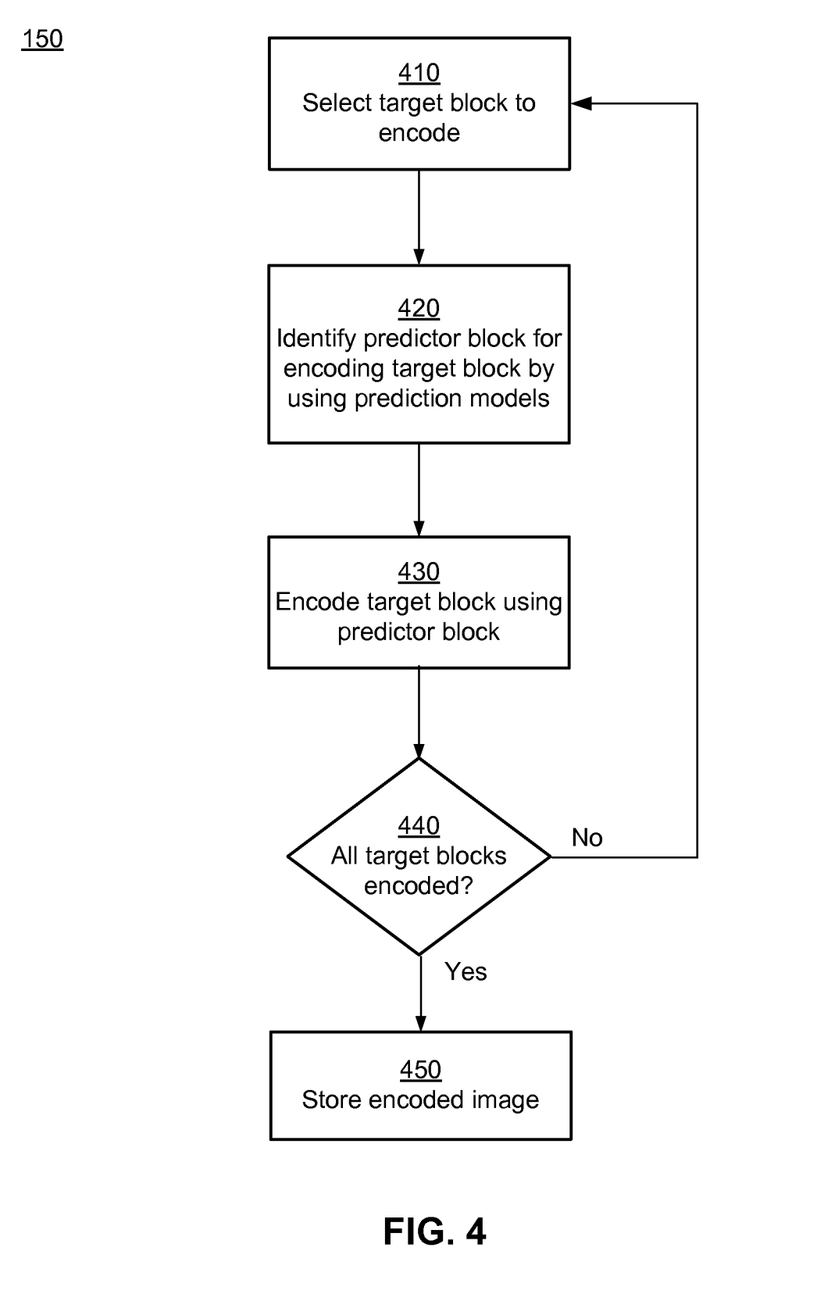
FIG. 4 is a flow diagram illustrating a process for encoding an image according to one embodiment of the present invention.

The exemplar dictionary 130 can be used to determine exemplars similar to a given input block of digital content, for example, for selecting predictor blocks for encoding an image. FIG. 4 is a flowchart illustrating steps performed by an embodiment of the image encoder module 135 for encoding an image. Other embodiments can perform different and/or additional steps. Moreover, other embodiments can perform the steps in different orders. Further, the steps can be performed by entities other than the module specified in the description of FIG. 4.

The encoder module 135 selects 410 a target block of an image 115 to encode. The encoder module 135 may select 410 the target block based on a scan-line order of traversal of the blocks of the image, a reverse scan-line order of traversal or any other order of traversal of the blocks of the image. The encoder module 135 identifies 420 a predictor block from the exemplar dictionary 130 using the prediction model 175 as further described using the flowchart of FIG. 5. The encoder module 135 encodes 430 the target block using information used to identify the predictor block and residual information. The encoder module 135 checks 440 if there are more blocks to be encoded. The above steps of encoding including steps 410, 420, and 430 are repeated until all target blocks are encoded. The encoder module 135 stores 450 the encoded image in the image store 260. In an embodiment, the target blocks of the image may be stored 450 before the processing of the next target block begins.

Selecting a Predictor Block

Figure 5:
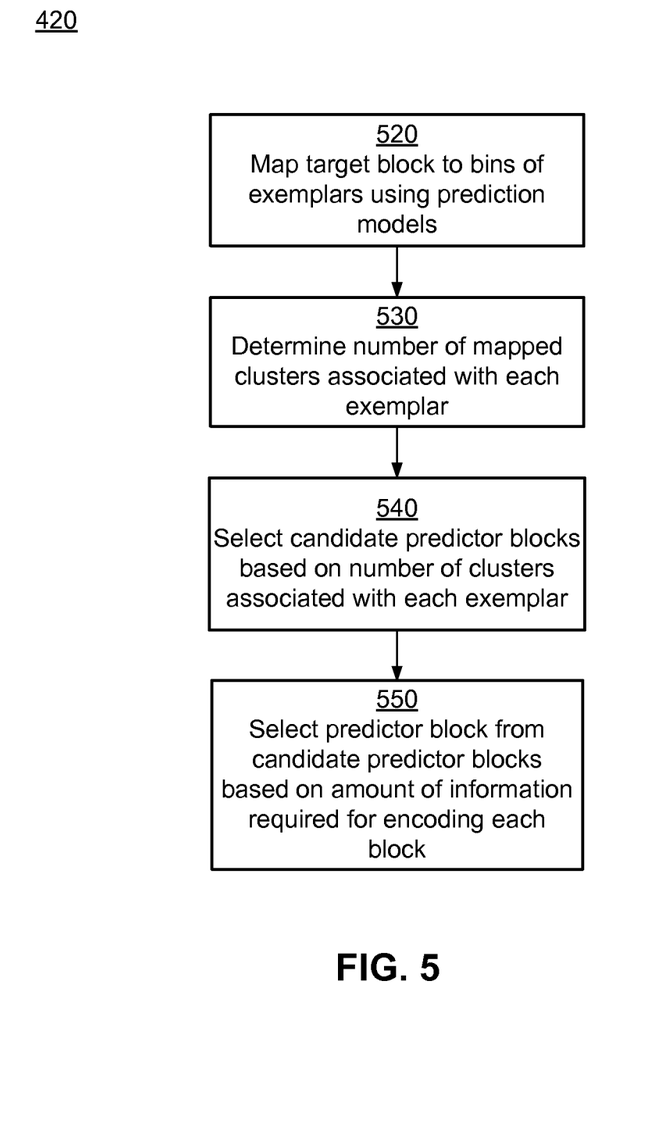
FIG. 5 is a flow diagram illustrating a process for identifying a predictor block for encoding a target block according to one embodiment of the present invention.

FIG. 5 illustrates the details of the step 420 for identifying a predictor block for a target image block according to an embodiment of an invention. In an embodiment, the encoder 135 uses multiple prediction models to map 520 a target image block to multiple labels. The encoder module 135 determines 530 the number of mapped clusters associated with each exemplar. For example, a prediction model M1 maps 520 the target image block to label L1, a prediction model M2 maps the target image block to label L2, and prediction model M3 maps the target image block to label L3. The labels L1, L2, and L3 are assumed to be associated with clusters C1, C2, and C3 of the exemplar dictionary 130 respectively. Assume cluster C1 comprises exemplars {e1, e2, e3}, cluster C2 comprises exemplars {e1, e4, e5} and cluster C3 comprises exemplars {e1, e2, e6}. In this example, the exemplar e1 is associated with all three clusters mapped to the target image block, exemplar e2 is associated with only two mapped clusters C1 and C3, and the remaining exemplars e3, e4, e5, and e6 are associated with one mapped cluster each. Accordingly, exemplar e1 is associated with the highest number of clusters, followed by e2, followed by the remaining clusters. The number of clusters associated with each exemplar is used to select 540 a set of candidate predictor blocks. An exemplar that belongs to a large number of mapped clusters is considered higher in a degree of similarity with respect to the target image block. The exemplars may be ranked based on their frequency of occurrence in the mapped clusters to select the candidate predictor blocks.

The predictor block is selected 550 from the candidate predictor blocks based on certain selection criteria. For example, a selection criterion selects the exemplar that minimizes the amount of information used encode the predictor block. The information used to encode a predictor block comprises the information used to identify the predictor block combined with the residual information representing a difference between the target image block and the predictor block. Another selection criterion selects 550 the candidate predictor block that minimizes a measure of distance compared to the target image block. Another selection criterion selects 550 the candidate predictor block that has the highest frequency of occurrence in the clusters mapped to the target image block.

The various selection criteria can be combined together. For example, a score based on frequency of occurrence of exemplars in the mapped clusters can be combined with the information required to encode the exemplars. In an embodiment, the selection criteria are combined as a weighted aggregate value.

Image Decoding

Figure 6:
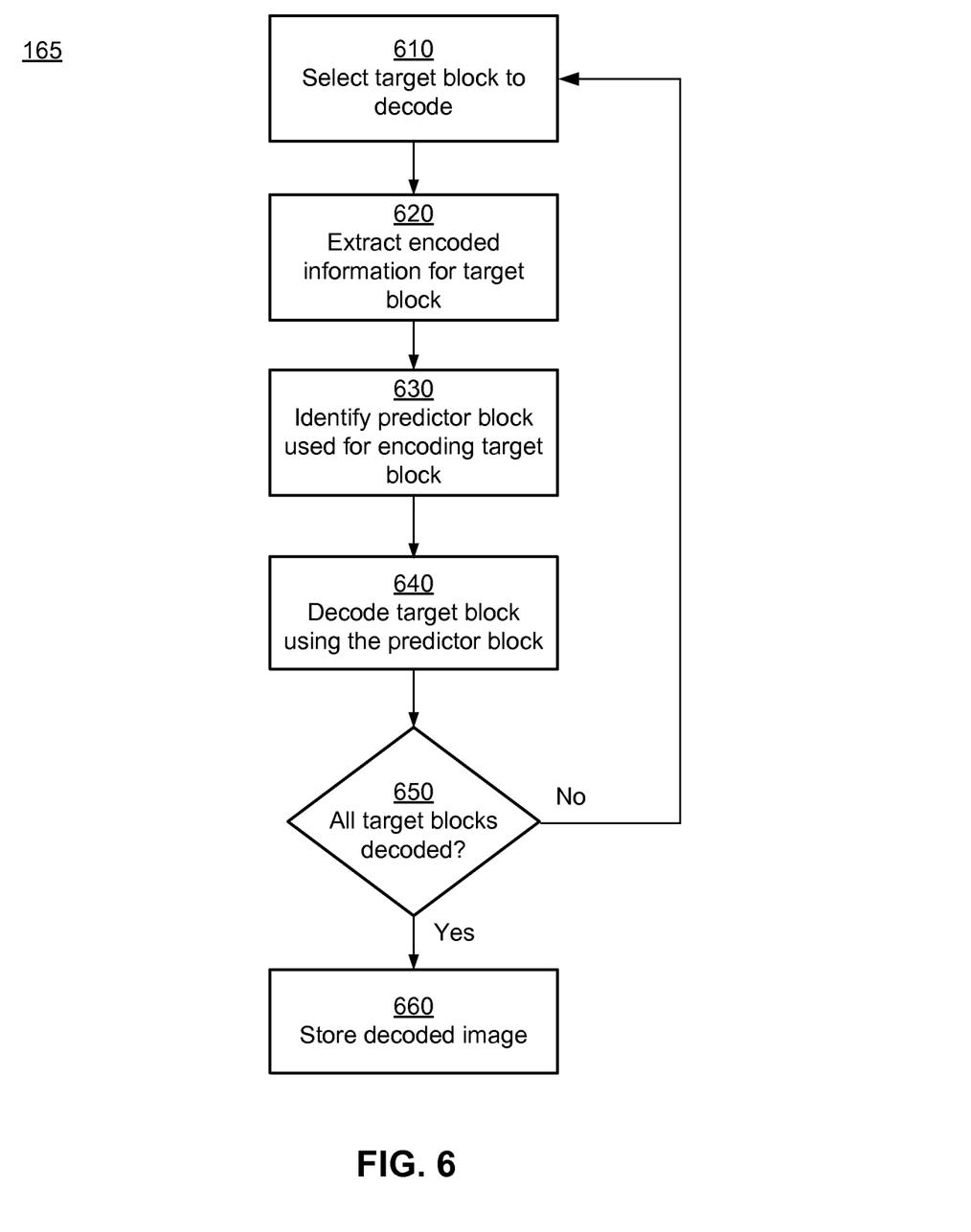
FIG. 6 is a flow diagram illustrating a process for decoding an image according to one embodiment of the present invention.

FIG. 6 is a flowchart illustrating steps performed by an embodiment of the image decoder module 145 for decoding an image encoded by the image encoder module 135. The image decoder module 145 selects 610 the next target block to decode. The image decoder module 145 extracts 620 the information for the target block from within the encoded image. The extracted information comprises information identifying a predictor block used for encoding the target block and residual information between the predictor block and the encoded target block.

The image decoder module 145 identifies 630 the predictor block used for encoding the target block. The image decoder module 145 decodes 640 the block based on the predictor block and the residual information available in the encoded target block. The image decoder module 145 checks 650 if all target blocks are decoded and continues decoding the remaining target blocks. The decoded image is stored 660 in the image store 260. In an embodiment, the decoded blocks may be stored 660 in the image store 260 while subsequent blocks are being decoded.

The processes described herein, for example, the process for building the exemplar dictionary, for encoding and decoding images can be generalized to any kind of digital content, including videos, images, audio and the like. For example, an exemplar dictionary can be built using exemplars of audio content and used for encoding/decoding of digital audio content. Similarly, an exemplar dictionary can be built using exemplars of videos and used for encoding/decoding digital video content.

Computer Architecture

Figure 7:
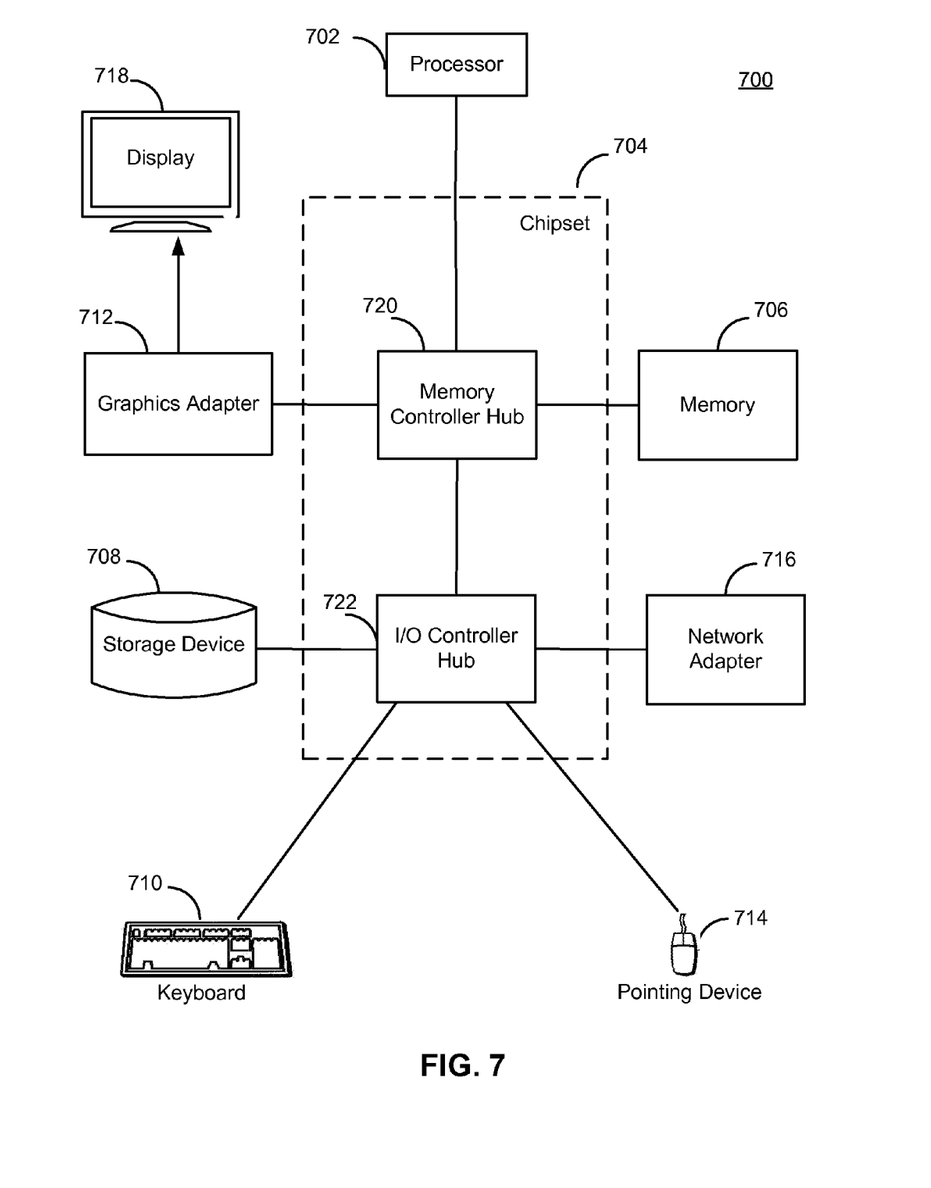
FIG. 7 is a high-level block diagram illustrating an example of a computer for use in the computing environment shown in FIG. 1 according to one embodiment of the present invention.

FIG. 7 is a high-level block diagram illustrating an example computer 700, such as the encoding/decoding systems 105, 110 shown in FIG. 1 and the computer system 210 shown in FIG. 2. The computer 700 includes at least one processor 702 coupled to a chipset 704. The chipset 704 includes a memory controller hub 720 and an input/output (I/O) controller hub 722. A memory 706 and a graphics adapter 712 are coupled to the memory controller hub 720, and a display 718 is coupled to the graphics adapter 712. A storage device 708, keyboard 710, pointing device 714, and network adapter 716 are coupled to the I/O controller hub 722. Other embodiments of the computer 700 have different architectures.

The storage device 708 is a non-transitory computer-readable storage medium such as a hard drive, compact disk read-only memory (CD-ROM), DVD, or a solid-state memory device. The memory 706 holds instructions and data used by the processor 702. The pointing device 714 is a mouse, track ball, or other type of pointing device, and is used in combination with the keyboard 710 to input data into the computer system 700. The graphics adapter 712 displays images and other information on the display 718. The network adapter 716 couples the computer system 700 to one or more computer networks.

The computer 700 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 708, loaded into the memory 706, and executed by the processor 702.

The types of computers 700 used as the computer systems of FIG. 1 can vary depending upon the embodiment and requirements. For example, the encoding system 105 used for encoding might include one or more blade computers lacking displays, keyboards, and/or other devices shown in FIG. 7. Likewise, the decoding system 110 used for decoding might comprise a mobile phone or other such device with a touch-sensitive display and limited processing power.

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for building/using an exemplar dictionary for image compression. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. A method for determining a predictor block for encoding an input block of digital content, the method comprising:
    receiving a target block of digital content for encoding;
    obtaining a plurality of clusters of exemplars by applying one or more prediction models to the target block, each prediction model mapping blocks of digital content to clusters of similar exemplars;
    determining a frequency of occurrence of exemplars in the plurality of clusters;
    selecting a predictor block for encoding the target block based on criteria including the frequency of occurrence of exemplars in the plurality of clusters; and
    encoding the target block using the predictor block.

2. The method of claim 1, wherein each prediction model is generated by iteratively refining the model, wherein the iterative refinement comprises:
    training the model using a mapping from the plurality of clusters to a plurality of labels;
    determining a strength of association between clusters and labels based on the model;
    changing the mapping so as to improve an aggregate strength of association between clusters and labels; and
    retraining the model using the changed mapping.

3. The method of claim 1, wherein a criterion for selecting a predictor block selects a first exemplar over a second exemplar if the first exemplar has a higher frequency of occurrence in the plurality of clusters compared to the second exemplar.

4. The method of claim 1, wherein the criteria for selecting the predictor block comprise an amount of information used for encoding the predictor block.

5. The method of claim 4, wherein the information used for encoding the predictor block comprises information identifying the predictor block.

6. The method of claim 4, wherein the information used for encoding the predictor block comprises residual information describing a difference between the predictor block and the target block.

7. A computer program product having a non-transitory computer-readable storage medium storing computer-executable code for determining a predictor block for encoding an input block of digital content, the code comprising:
    an encoder module configured to:
        receive a target block of digital content for encoding;
        obtain a plurality of clusters of exemplars by applying one or more prediction models to the target block, each prediction model mapping blocks of digital content to clusters of similar exemplars;
        determine a frequency of occurrence of exemplars in the plurality of clusters;
        select a predictor block for encoding the target block based on criteria including the frequency of occurrence of exemplars in the plurality of clusters; and
        encode the target block using the predictor block.

8. The computer program product of claim 7, wherein each prediction model is generated by a dictionary builder module configured to:
    train the model using a mapping from the plurality of clusters to a plurality of labels;
    determine a strength of association between clusters and labels based on the model;
    change the mapping so as to improve an aggregate strength of association between clusters and labels; and
    retrain the model using the changed mapping.

9. The computer program product of claim 7, wherein a criterion for selecting a predictor block selects a first exemplar over a second exemplar if the first exemplar has a higher frequency of occurrence in the plurality of clusters compared to the second exemplar.

10. The computer program product of claim 7, wherein the criteria for selecting the predictor block comprise an amount of information used for encoding the predictor block.

11. The computer program product of claim 10, wherein the information used for encoding the predictor block comprises information identifying the predictor block.

12. The computer program product of claim 10, wherein the information used for encoding the predictor block comprises residual information describing a difference between the predictor block and the target block.

13. A computer-implemented system for determining a predictor block for encoding an input block of digital content, the system comprising:
    a computer processor; and
    a computer-readable storage medium storing computer program modules configured to execute on the computer processor, the computer program modules comprising:
        an encoder module configured to:
            receive a target block of digital content for encoding;
            obtain a plurality of clusters of exemplars by applying one or more prediction models to the target block, each prediction model mapping blocks of digital content to clusters of similar exemplars;
            determine a frequency of occurrence of exemplars in the plurality of clusters;
            select a predictor block for encoding the target block based on criteria including the frequency of occurrence of exemplars in the plurality of clusters; and
            encode the target block using the predictor block.

14. The computer-implemented system of claim 13, wherein each prediction model is generated by a dictionary builder module configured to:
    train the model using a mapping from the plurality of clusters to a plurality of labels;
    determine a strength of association between clusters and labels based on the model;
    change the mapping so as to improve an aggregate strength of association between clusters and labels; and
    retrain the model using the changed mapping.

15. The computer-implemented system of claim 13, wherein a criterion for selecting a predictor block selects a first exemplar over a second exemplar if the first exemplar has a higher frequency of occurrence in the plurality of clusters compared to the second exemplar.

16. The computer-implemented system of claim 13, wherein the criteria for selecting the predictor block comprise an amount of information used for encoding the predictor block.

17. The computer-implemented system of claim 16, wherein the information used for encoding the predictor block comprises information identifying the predictor block.

18. The computer-implemented system of claim 16, wherein the information used for encoding the predictor block comprises residual information describing a difference between the predictor block and the target block.

* * * * *